2,820,314
FISHING LURE CONSTRUCTION

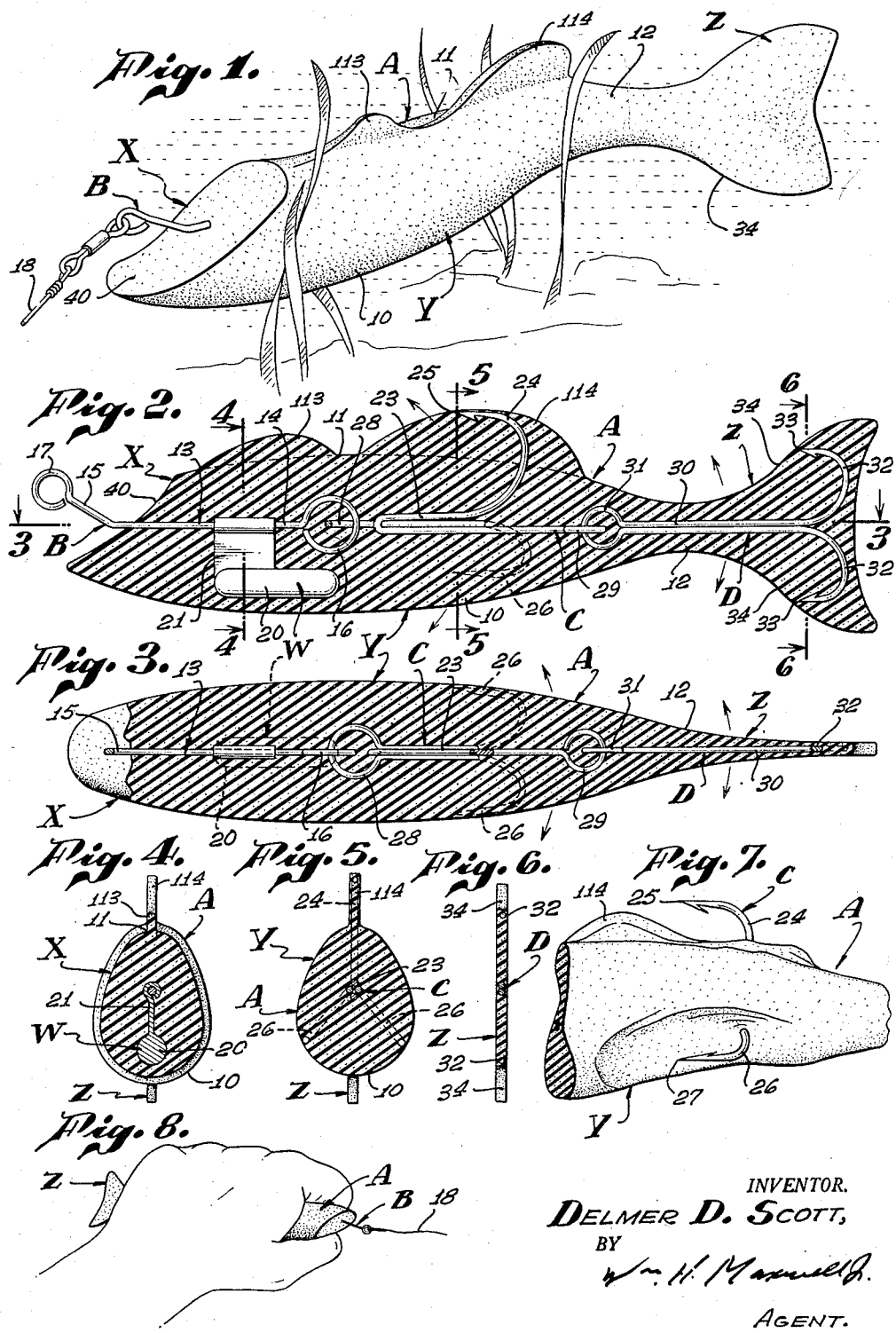

Delmer D. Scott, Encino, Calif., assignor to Jack B. Nethercutt, Los Angeles, Calif.

Application January 25, 1954, Serial No. 405,774

1 Claim. (Cl. 43—42.1)

This invention has to do with a fishing lure construction and it is a general object of the invention to provide a practical, effective, improved lure construction of the type that is drawn through water to serve as an object at which fish strike, and which has hook means disposed therein to catch fish that strike at the lure.

It is generally recognized that all fish subject to being caught by lures or artificial bait, will not readily take to or bite at any lure, but that the appearance and the action of the lure in the water materially influences its effectiveness. Furthermore, the striking habits of a particular variety of fish may vary from time to time or from one locality to another, so that lures having different actions and appearances are desirable. In some cases it is desirable to employ a lure that passes or flows straight through water, while in other situations an irregular or zig zag action of the lure is desirable. Still further, in practice, the depth at which the lure operates may be important, and in some cases it is desirable that the lure travel along or near the surface of the water, while in other cases it is preferred that it operate well beneath the surface of the water.

As a result of the aforementioned, generally recognized factors, lures of various characters have been proposed and used, and as a result where a lure is to be employed, as where fish are to be taken by trolling, or the like, it is common for fishermen, whether fishing for pleasure or commercially, to be stocked with numerous lures of different forms and characters which are interchanged or tried one after another until it is determined which lure is most suitable for the particular conditions encountered.

It is also generally recognized that most game fish inhabit or frequent bodies of water where there is an abundance of rocks, vegetable growth and other like obstructions, in or upon which the hooks of ordinary fishing lures become engaged and snagged, with the result that the lures thus engaged or snagged are frequently lost or are rendered ineffective due to material, such as grass, that is hooked and is trailed behind them.

As a result of the above, fishermen are frequently unable to draw a lure past an obstruction where fish are known to inhabit, but must troll to one side or away from the obstruction and trust the fish will come out.

It has further been found that fish when feeding frequently try the food or bait before they actually bite, and if they find it to be too hard, or not life like or real to the touch, they will spit it out.

It is a general object of this invention to provide a lure construction that can be used to advantage in fishing where a lure is to be operated through the water, and which is such that it can be easily and quickly set or established in such manner as to have a desirable action in the water. With the construction of the present invention the lure may be varied or set to have various actions such as those hereinabove referred to, and furthermore it can be so set that these actions are obtained to varying degrees.

Another object of the invention is to provide a lure that is not subject to being caught on obstructions in the water and will not pick up or catch and trail foreign matter, such as grass or the like.

Another object of the invention is to provide a lure of the general character referred to which is of simple, inexpensive, compact form and construction, making it commercially practical and highly desirable for use either for sport or commercial fishing.

It is another object of the invention to provide a lure construction of the general character referred to which employs a body that can be advantageously formed to be in the nature of an attractive lure, as for example, to resemble or even be in a near likeness to a fish, beetle, frog or any other type of bait, either artificial or live that is known to be effective for catching fish, and which is substantially life-like to the touch.

It is an object of the present invention to provide a lure of the general character referred to which employs a body that can be easily and quickly made to sink or float in the water.

Still another object of the present invention is to provide a lure that will remain in the water in an upright position at all times.

It is another object of the invention to provide a lure of the general character referred to wherein the hooks are wholly within the body of the lure where they are out of sight and protected.

Another object of the present invention is to provide a lure which employs a body that is pliable and that will yieldably part and draw away from the hooks upon the exertion of little pressure upon the exterior thereof.

The lure construction provided by the present invention is preferably formed or provided with a body which is so shaped, formed, proportioned and colored as to be in the general likeness of, or a close fascimile to, a live bait, such as a beetle, frog or fish. The lure body is preferably formed of a soft, resilient and compressible, sponge-like material which has such strength and other characteristics as to be tough, strong and durable, in order to withstand the stress, strain and abuse to which a device of this character is subjected to in the course of being handled and used. In a typical form or carrying out of the invention, the body of the lure may be formed of foam rubber latex, or any other soft sponge-like material, which possesses generally the characteristics of sponge rubber, or the like.

The invention further provides coating the body of the lure with a suitable water repellant material, as for example a silicone coating, which coating will normally stop or check flow of water into and out of the body, but is such that water may be admitted into or exhausted from within the body by the exertion of external pressures.

The invention further provides a core in the forward portion of the body to project forwardly therefrom, and formed of a length of malleable wire, or the like. The core may in practice be provided with a loop at its forward end to receive a suitable leader or fish line and may also carry a suitable ballast weight to maintain the lure in an upright position in the water.

One or more hook units are provided in the lure body and, in practice, the hook units employed may be varied widely in form, type, size and arrangement, depending upon the configuration, or form of the lure body and the conditions to be encountered when the lure is used. In a typical lure construction as provided by the present invention, a hook unit may involve an elongate shank with eyes or loops at its ends, and a plurality of hooks projecting radially therefrom. In a typical situation the hook units are engaged with the core and to each other in looped or linked relationship and are so arranged as to occur wholly within the body with the hooks projecting radially from the shanks to occur immediately inside the side walls of the body.

The various objects and features of my invention will be fully understood from the following detailed description of a typical preferred form and application of my invention, throughout which description reference is made to the accompanying drawings, in which:

Fig. 1 is a perspective view of a fishing lure embodying the construction of my invention. Fig. 2 is a longitudinal sectional view of the lure shown in Fig. 1. Fig. 3 is a longitudinal sectional view taken as indicated by line 3—3 on Fig. 2. Fig. 4 is a transverse sectional view taken as indicated by line 4—4 on Fig. 2. Fig. 5 is a longitudinal sectional view taken as indicated by line 5—5 on Fig. 2. Fig. 6 is a transverse sectional view taken as indicated by line 6—6 on Fig. 2. Fig. 7 is a view of a portion of the lure illustrated throughout the drawings and showing the hooks bared. Fig. 8 is a perspective view of the lure shown in Fig. 1, and being gripped by a hand.

The present invention has to do with a fishing lure construction that can be used, or employed to advantage in fishing lures of varying size and shape.

For the purpose of illustration I have chosen to show and describe a fishing lure in the likeness of a fish and incorporating the various novel features provided by the present invention.

The particular lure illustrated throughout the drawings, includes, generally, an elongate hoirzontally disposed fish-shaped body A, a core assembly B entering the forward or front end of the body A, a central hook unit C arranged wholly within the body A midway between the ends thereof and pivotally connected to the core, and a rear hook unit D pivotally connected to the central hook unit C and located wholly within the tail or rear end portion of the body.

The fish-shaped body A is characterized by a forward head portion X, a central middle portion Y, and a rear tail portion Z. The head and middle portions X and Y of the body are substantially oval or egg-shaped in cross sectional configuration, the lower half thereof being somewhat larger than the upper half, thereby establishing an enlarged belly portion 10 extending longitudinlly along the underside of the body A, and a narrower upper or back portion 11 extending longitudinally along the uppermost side of the body A.

The tail portion Z of the body A is a flat vertically disposed member, shaped to resemble a homocercal fish tail having upper and lower caudal fins, and is integrally connected to the central portion Y of the body by an intermediate or connector section 12 of reduced cross sectional configuration that fairs gracefully and smoothly into and between the central body portion Y and tail Z.

The body A further includes front and rear vertically disposed dorsal fins 113 and 114 extending along the back portion 11 thereof.

The core unit B entering the forward end of the body A includes an elongate horizontally disposed tie member 13 having an inner portion 14 entering the head portion X of the body to occur along the central longitudinal axis of the body and terminating adjacent the forward end of the middle portion Y of the body, and an outer portion 15 projecting forwardly from the head portion X of the body and terminating at a point beyond the forward end thereof. The tie member 13 of the core unit B further includes like vertically disposed inner and outer eyes 16 and 17 at the inner and outer terminal ends thereof. The outer tie is located outward of the body and is adapted to be engaged by a suitable leader or fishing line 18 by which the lure is drawn through the water, while the inner eye 16 is located within the body and is adapted to cooperate with the central hook unit C in a manner that will be hereinafter described.

The core unit B also includes a ballast weight W located in the lower belly portion 10 of the body A so that the center of gravity of the lure is below the central longitudinal axis thereof, with the result that the lure when in the water will remain in an upright position at all times. The ballast weight W is preferably formed of lead or other like ballast material, and is shown as having an elongate body 20 with an upwardly projecting tongue 21 at its forward end and projecting upwardly therefrom to engage the inner end portion 14 of the tie member 13, to be secured thereto in such manner as to form an integral part of the core unit. In the particular case illustrated, the tongue 21 of the weight W is shown as being secured to the tie member 13 by bending the uppermost end thereof around the tie member. It is to be understood, however, that the weight W can, in practice, be varied greatly in size and shape and could be carried by the body of the lure, independently of the member.

The central hook unit C is shown as including a triple gang hook having an elongate horizontally disposed central shank 23 arranged along the central longitudinal axis of the body, an upwardly projecting hook 24 on the shank midway between its ends and projecting upwardly to terminate in the rear dorsal fin 114 on the back 11 of the body and provided with a forwardly facing sharp tip 25 occurring just inside the skin or surface of the fin. The hook unit C further includes a pair of like downwardly and outwardly projecting hooks 26 on the shank 23 midway between its ends and provided with forwardly facing sharp tip portions 27 that occur at opposite sides of the belly portion 10 and just inside the skin or outer surface of the body. The shank portion 23 of the gang hook is provided with a horizontally disposed eye 28 at its forward end arranged in looped engagement with the vertically disposed eye on the inner end of the tie member 13, and a horizontally disposed eye 29 at its rearmost end and adapted to be related to the rear hook unit D in a manner that will be hereinafter described.

The rear hook unit D is shown as a double gang hook with an elongate horizontally disposed shank 31 arranged in the body A to extend from the middle portion Y to the tail portion Z and along the central longitudinal axis thereof. The shank 30 of the rear hook unit D is provided with a vertically disposed eye 31 at its forward end arranged in looped relationship with the horizontally disposed eye 29 at the rear end of the shank of the central unit C. The shank 30 of the hook unit D is further provided at its rearmost end with upper end lower vertically disposed hooks 32 with forwardly facing sharp tips 33 at their outer ends and occurring wholly within the tail portion Z of the body so that the tips 33 thereof occur just inside the forward or leading edge 34 of the tail fin.

In the preferred carrying out of the invention the body A is formed of a soft resilient water absorbent sponge-like material that can be advantageously molded or formed into various shapes adapted for use as fishing lures, and about the other elements of the lure construction.

In practice, I have found that the material commonly referred to and known in the art as "foam rubber latex" is particularly adapted for use in my lure construction, however, it is to be understood that other materials of interconnected cellular structure and having substantially the same characteristics as foam rubber latex can be used if desired.

It is desirable that the material employed to form the body be such that it will slowly absorb water and sink. It is also desirable that the material be soft, compressible and resilient so that little effort or pressure is required to flatten, stretch or otherwise shift or deform the various portions thereof, and such that it will readily return to its original configuration when such pressures are released.

From the above it will be apparent that the body A provided by the present invention will readily bend or flex as it is drawn through the water and past obstructions therein, and is such that it will yield and compress if external pressures are exerted upon it, as for instance, if it is bitten by a fish, with the result that the hook units within the body are uncovered or bared.

It will also be seen that by bending the malleable tie member 13 of the core unit B so that the forward eye 17 thereon, to which the fish line is secured, is off-set from the longitudinal axis of the body, the lure will move or have an erratic action as it is drawn through water. By bending the tie member 13 to various degrees relative to the central longitudinal axis of the body, the action of the lure in the water can be advantageously controlled.

The eyes of 16, 17, 28, 29 and 31 on the core unit B, central hook unit C, and rear hook unit D are of substantial size so that they can be advantageously linked or arranged in loose or free looped relationship with each other.

With the above relationship of elements it will be apparent that the head, middle and tail portions X, Y and Z of the body A, are free to flex and move relative to each other in a manner similar to that of a fish as the lure is drawn through the water.

In the particular form of the invention illustrated the head portion X of the body is provided with a substantially flat downwardly and forwardly inclined deflecting face 40 adapted to cooperate with the malleable tie member 13 and react in the water to cause the lure to move erratically and submerge or move downwardly as it is drawn through the water. It is to be understood that the deflecting face 40 could, if desired, be dispensed with, and that in certain forms of lines would be undesirable.

In the preferred carrying out of the invention the body A is provided with a coating of water repellant material, which under normal conditions stops or restricts flow of water into and out of the sponge-like material of which the body is formed, but will allow or permit water to enter or be exhausted from the body under pressure. In practice, I have found that a silicone coating such as one of Dow-Corning Series No. 200 fluids, and as described on page 20 of Dow-Corning Silicone Note Book No. 2003, issued June, 1952, is particularly adapted to accomplish the above desired result.

With the body A of the lure waterproofed in a manner described above, it is possible to vary its specific gravity or weight by admitting water into or discharging from within the body. The introduction of water into the body can be easily and quickly accomplished by gripping the lure in the hand in the manner illustrated in Fig. 8 of the drawings, sequeezing or collapsing the lure to displace the air within and then submerging it into the water and allowing it to draw the water in as it returns to its natural state, or shape.

Displacement of water from within the body can be accomplished by gripping and squeezing the lure in the same manner as above described to displace the water therein and then permit it to draw in air as it returns to its natural state, or shape.

By controlling the apparent specific gravity or weight of the lure in the manner described above, it will be apparent that the fisherman can easily and quickly control the buoyancy characteristics of the lure in the water, that is, control the depth at which the lure will float in the water, or, control the rate at which it will sink, or submerge as it is drawn through water.

In another form of the invention the waterproofed coating may be dispensed with, so that the lure after being put into the water will at first float and then gradually fill with water and sink, thereby imparting a unique action or manner of travel, as it is drawn through water.

In another form of the invention, the body of the lure may be waterproof, as by providing it with a thin latex or rubber coating, or, if desired, the body may be formed of a foam rubber-like material of independent or unconnected cellular structure that will not absorb the water. In this form of the invention the apparent specific gravity or weight of the lure remains constant and cannot be varied, except by the ballast weight that is applied to, or formed in the lure when it is molded or cast.

It is to be understood that the lure body construction that I provide could, if desired, be advantageously employed in a conventional lure construction wherein the hooks are positioned to occur at the exterior of the body where they are fully exposed and unprotected.

Having described only typical forms and applications of my invention, I do not wish to be limited or restricted to the specific details herein set forth, but wish to reserve to myself any variations or modifications that may appear to those skilled in the art and fall within the scope of the following claim:

Having described my invention, I claim:

A fishing lure of the character described including, a fish hook adapted to be secured to a fish line, a body in the form of a live bait yieldingly covering the hook and formed of interconnected cellular material, and a water repellant silicone coating normally stopping flow of water into and out of the cellular body, the body being manually compressible to selectively draw in and/or exchange water through said coating.

References Cited in the file of this patent
UNITED STATES PATENTS

| | | |
|---|---|---|
| 779,083 | Jamison | Jan. 3, 1905 |
| 1,846,538 | Albers et al. | Feb. 23, 1932 |
| 1,993,018 | Pfeifle | Mar. 5, 1938 |
| 2,183,816 | Lovelace | Dec. 19, 1939 |
| 2,214,360 | Woodley | Sept. 10, 1940 |
| 2,261,068 | Mackovich | Oct. 28, 1941 |
| 2,547,694 | Dosmann | Apr. 3, 1951 |
| 2,567,315 | Bidand et al. | Sept. 11, 1951 |
| 2,567,804 | Davies | Sept. 11, 1951 |
| 2,590,461 | Rasch | Mar. 25, 1952 |
| 2,605,578 | Waterton | Aug. 5, 1952 |
| 2,652,182 | Umbdenstock | Sept. 15, 1953 |

OTHER REFERENCES

"Dow-Corning," Silicone Notebook—Fluid Series No. 3, published September 1948. Page 24 especially cited.